United States Patent
Xu et al.

(10) Patent No.: US 12,279,611 B2
(45) Date of Patent: Apr. 22, 2025

(54) METHOD FOR CONTROLLING INSECTS WHERE AN ALKOXYLATED GLYCEROL IS APPLIED TO SOIL

(71) Applicant: BASF SE, Ludwigshafen am Rhein (DE)

(72) Inventors: Wen Xu, Research Triangle Park, NC (US); James W. Austin, Research Triangle Park, NC (US); Michael Krapp, Limburgerhof (DE)

(73) Assignee: BASF SE, Ludwigshafen am Rhein (DE)

( * ) Notice: Subject to any disclaimer, the term of this patent is extended or adjusted under 35 U.S.C. 154(b) by 770 days.

(21) Appl. No.: 16/321,706

(22) PCT Filed: Jul. 25, 2017

(86) PCT No.: PCT/EP2017/068758
§ 371 (c)(1),
(2) Date: Jan. 29, 2019

(87) PCT Pub. No.: WO2018/019828
PCT Pub. Date: Feb. 1, 2018

(65) Prior Publication Data
US 2021/0274777 A1  Sep. 9, 2021

(30) Foreign Application Priority Data
Jul. 29, 2016  (EP) ..................... 16181823

(51) Int. Cl.
*A01N 25/04* (2006.01)
*A01N 43/36* (2006.01)

(52) U.S. Cl.
CPC ............. *A01N 25/04* (2013.01); *A01N 43/36* (2013.01)

(58) Field of Classification Search
CPC ......... A01N 25/04; A01N 43/36; A01N 25/30
See application file for complete search history.

(56) References Cited

U.S. PATENT DOCUMENTS

| | | | | |
|---|---|---|---|---|
| 4,851,421 A * | 7/1989 | Iwasaki | ................... | A01N 25/14 514/952 |
| 5,942,482 A * | 8/1999 | Zocchi | .................... | C11D 1/83 510/342 |
| 9,801,372 B2 * | 10/2017 | Ishaque | ................... | A01N 25/30 |
| 2002/0176854 A1 * | 11/2002 | Payton | .................... | A01N 61/00 424/94.63 |
| 2012/0053221 A1 * | 3/2012 | Ishaque | ................... | A01N 25/30 514/407 |
| 2013/0053349 A1 * | 2/2013 | Mainx | .................. | A01N 43/653 514/532 |
| 2013/0137571 A1 * | 5/2013 | Saxell | .................... | A61P 33/00 514/136 |
| 2015/0289502 A1 * | 10/2015 | Blease | ................... | C08G 63/78 528/271 |
| 2017/0105409 A1 | 4/2017 | Auweter et al. | | |
| 2018/0132468 A1 | 5/2018 | Cink et al. | | |
| 2018/0220644 A1 | 8/2018 | Krapp et al. | | |
| 2019/0000077 A1 | 1/2019 | Xu et al. | | |

FOREIGN PATENT DOCUMENTS

| | | |
|---|---|---|
| CN | 101584315 A | 11/2009 |
| CN | 101700017 A | 5/2010 |
| CN | 104020407 A | 9/2014 |
| CN | 104126605 A | 11/2014 |
| EP | 0237960 A2 | 9/1987 |
| JP | S55141402 A | 11/1980 |
| WO | 2010130680 A2 | 11/2010 |
| WO | 2011042495 A2 | 4/2011 |
| WO | 2011106420 A1 | 9/2011 |
| WO | 2016016042 A1 | 2/2016 |
| WO | 2017025582 A1 | 2/2017 |

OTHER PUBLICATIONS

Osbrink, W., Effect of Tolerance to Insecticides on Substrate Penetration by Formosan Subterranean Termites (*Isoptera: rhinotermitidae*), 2002, Journal of Economic Entomology, vol. 95, Issue No. 5, pp. 989-1000. (Year: 2002).*
Fipronil, Data Sheet [online]. NIH National Library of Medicine, 2022 [retrieved on Feb. 4, 2022]. Retrieved from the Internet: <https://pubchem.ncbi.nlm.nih.gov/compound/3352>, pp. 1-7. (Year: 2022).*
European Search Report for EP Patent Application No. 16181823.2, Issued on Nov. 8, 2016, 3 pages.
International Search Report and Written Opinion for International Application No. PCT/EP2017/068758, Issued on Sep. 29, 2017, 8 pages.

* cited by examiner

*Primary Examiner* — Monica A Shin
(74) *Attorney, Agent, or Firm* — Armstrong Teasdale LLP

(57) ABSTRACT

Described herein is a method for controlling insects where a composition including an insecticide and a polymer are applied to soil, where the polymer is formed from an initiator and a plurality of $C_2$ to $C_6$ alkylene oxide units, and where the initiator is an aliphatic polyol with at least three hydroxyl groups. Also described herein is a composition including an insecticide and a polymer, where the polymer is formed from an initiator and a plurality of $C_2$ to $C_6$ alkylene oxide units, and where the initiator is an aliphatic polyol with at least three hydroxyl groups.

16 Claims, No Drawings

METHOD FOR CONTROLLING INSECTS WHERE AN ALKOXYLATED GLYCEROL IS APPLIED TO SOIL

CROSS-REFERENCE TO RELATED APPLICATIONS

This application is a U.S. National Phase Application of PCT/EP2017/068758, filed Jul. 25, 2017, which claims the benefit of priority to European Patent Application No. 16181823.2, filed Jul. 29, 2016, the entire contents of which are hereby incorporated by reference herein.

The present invention relates to a method for controlling insects where a composition comprising an insecticide and a polymer are applied to soil, where the polymer is formed from an initiator and a plurality of $C_2$ to $C_6$ alkylene oxide units, and where the initiator is an aliphatic polyol with at least three hydroxyl groups. The invention further relates to a composition comprising an insecticide and a polymer, where the polymer is formed from an initiator and a plurality of $C_2$ to $C_6$ alkylene oxide units, and where the initiator is an aliphatic polyol with at least three hydroxyl groups. The present invention comprises combinations of preferred features with other preferred features.

Many agrochemical formulations comprise insecticides which have barely any soil mobility or none whatsoever after application. In particular cases, however, increased and controlled soil mobility is advantageous, for example in the control of soil-dwelling pests, especially termites.

When the intention is to transfer insecticides with low soil mobility into deeper soil layers in a controlled manner, the options available are almost exclusively mechanical: the digging of trenches and direct treatment of the trench walls, and the spraying of the active ingredient formulation under pressure into deeper soil layers are examples thereof. Such methods require a high degree of labor and/or equipment.

It is an object of the invention to provide compounds which improve the soil mobility of insecticides, especially which have high absorptivity in soil, such that the active ingredient gets into deeper soil layers with reduced labor, if any.

The object was solved by a method for controlling insects where an composition comprising an insecticide and a polymer is applied to soil, where the polymer is formed from an initiator and a plurality of $C_2$ to $C_6$ alkylene oxide units, and where the initiator is an aliphatic polyol with at least three hydroxyl groups.

The term "applied to soil" includes for example the application from the top to the soil, or the application into the soil. The composition is applied to soil, for example by drenching the soil, by direct placement into the soil (e.g. by digging, trenching and/or rodding), by drip irrigation onto the soil, by dipping roots, tubers or bulbs, in furrow application, nursery tray application, or by soil injection. Preferably the composition is applied to soil by drenching the soil or by soil injection. In particular, the composition is applied to soil by soil injection.

In the method for controlling insects the composition comprising an insecticide and a polymer is usually applied in form of an aqueous dilution. The concentration of the insecticide in the aqueous dilution is adjusted according to the usual application concentrations or rates, e.g. as given on the product label of the composition. The aqueous dilution may comprise from 100 to 10,000 ppm, preferably from 300 to 6,000 ppm, and in particular from 500 to 4,000 ppm of the polymer. The polymer may be present in the composition or it may be added to the composition when preparing the aqueous dilution.

The soil is usually adjacent a structure, e.g. a building. Suitable structures are a building, a deck, any landscaping that may be near the building and/or deck, around utility poles, and around plants. Preferred structures are buildings. Preferably, the soil is present under a building or within a radius of 50 m (preferably 25 m, and in particular 10 m) thereof.

In one form the composition is applied into soil by direct placement of the composition into the soil. The placement may involve the digging of a trench (e.g. approximately 4 to 6 inches wide by 6 inches deep) into which the composition is applied (e.g. at a rate of 4 gallons per 10 linear feet of trench per foot of depth). The placement may also involve the dispensing of the composition into the ground through the use of a rod injection tool, which may be plunged down into the ground or to the top of a footer (i.e., a part of the building's foundation). The placement may involve in another form the application of the composition in trenches, such as in trenches with a depth of 1 to 30 cm, preferably 2 to 15 cm, and in particular 2 to 10 cm.

In a preferred form the composition is applied into soil by soil injection. The soil injection may comprise treating soil adjacent a structure. The soil injection may comprise the injection with an injection apparatus, e.g. comprising following steps: positioning an injection apparatus over a first injection site generally adjacent a structure; operating the injection apparatus to inject insecticide down into the soil at said first injection site, said operating step being performed without prior disturbance of the soil at said first injection site; moving the injection apparatus over a second injection site at least in part different from said first injection site and generally adjacent the structure; and operating the injection apparatus to inject insecticide down into the soil at said second injection site, said operating step being performed without prior disturbance of the soil at said second injection site. Suitable soil injection methods and apparatus are known e.g. from WO2011/106420.

The term "insecticide" comprises, unless evident from the context, not only insecticides in the narrower sense, i.e. active ingredients suitable for controlling insects, but also further active ingredients suitable for controlling soil-dwelling invertebrate pests, especially nematicides and acaricides. A termiticide is usually an insecticide suitable for controlling termites.

The insecticide (preferably the termiticide) has usually water-insoluble. The insecticide may have a solubility in water (e.g. at 20° C.) of up to 10 g/l, preferably up to 2 g/l, and in particular up to 0.5 g/l.

The insecticides used in accordance with the invention preferably have a soil absorption coefficient $K_{o/c}$ of >250, more preferably >400. Preference is given to the use of an insecticide having a water solubility of <1.0 g/l at 25° C. and 1013 mbar and a $K_{o/c}$ value of >250.

The $K_{o/c}$ describes the distribution of an active ingredient between the organic component of the soil and an aqueous solution. High $K_{o/c}$ values show strong binding of the active ingredients to the organic soil substance; the soil mobility is therefore lower than in the case of those active ingredients with lower $K_{o/c}$ values. The $K_{o/c}$ value is calculated by the formula:

$$K_{o/c} = K_d \times 100 / C_{org} \, [\%]$$

where the $K_d$ value denotes the soil/water partition coefficient for an active ingredient equilibrium and $C_{org}$ the carbon content of the soil in %. The experimental procedure in $K_{o/c}$ value determinations is described in detail in OECD guideline no. 106. In this procedure, a suspension of soil and 0.01 M $CaCl_2$ solution is prepared. To this suspension is added (preferably radiolabeled) active ingredient in (in the simplest case) one concentration dissolved in a very small amount of organic solvent, and the mixture is shaken gently. When an equilibrium of the concentrations of the active ingredient in the two phases has formed after a few hours, the concentration in the soil and in the $CaCl_2$ solution is determined. The quotient of the concentrations in the soil and in the $CaCl_2$ solution are used to obtain the $K_d$ value, from which the $K_{o/c}$ value for the particular soil results taking account of the organic carbon content of the soil. According to the invention, standard soil is considered to be "LUFA 2.3" soil (sandy loam [according to USDA classification] with a pH of approx. 7 [measured in $CaCl_2$] and an organic carbon content of approx. 1.1%). Low-mobility active ingredients are considered to be those having a $K_{o/c}$ value of >250.

Mixtures of insecticides are also suitable. Mixtures of insecticides with other pesticides, e.g. fungicides are also suitable.

Suitable insecticides are fipronil, pyrethroide, 4-chloro-2-(2-chloro-2-methylpropyl)-5-[(6-iodo-3-pyridinyl) methoxy]-3(2H)-pyridazinone (CAS-RN: 120955-77-3), chlorantraniliprole, chlorfenapyr, chlorpyrifos, cyantraniliprole, fenoxycarb, flufenoxuron, hydramethylnon, imidacloprid, indoxacarb, metaflumizone, pyriproxifen, tebufenozide, fenvalerate, tefluthrin, and broflanilide.

Preferred insecticides are fipronil, allethrin, alpha-cypermethrin, beta-cyfluthrin, bifenthrin, bioallethrin, 4-chloro-2-(2-chloro-2-methylpropyl)-5-[(6-iodo-3-pyridinyl) methoxy]-3(2H)-pyridazinone (CAS-RN: 120955-77-3), chlorantraniliprole, chlorfenapyr, chlorpyrifos, cyantraniliprole, cyfluthrin, cyhalothrin, cypermethrin, deltamethrin, etofenprox, fenoxycarb, flufenoxuron, hydramethylnon, imidacloprid, indoxacarb, metaflumizone, permethrin, pyriproxifen, tebufenozide, tralomethrin, and broflanilide.

Particular preference is given to fipronil, alpha-cypermethrin, bifenthrin, chlorantraniliprole, chlorfenapyr, cyfluthrin, cypermethrin, cyantraniliprole, deltamethrin, etofenprox, hydramethylnon, indoxacarb, metaflumizone, permethrin, and broflanilide.

Very particular preference is given to fipronil, alpha-cypermethrin, chlorantraniliprole, chlorfenapyr, cyantraniliprole, deltamethrin, hydramethylnon, indoxacarb, metaflumizone, and broflanilide.

Fipronil, chlorfenapyr and broflanilide are especially preferred.

The weight ratio of the insecticide to the polymer is usually in the range from 5:1 to 1:50, preferably from 4:1 to 1:50, and in particular from 3:1 to 1:40. In another form the weight ratio of the insecticide to the polymer is usually in the range from 5:1 to 1:30, preferably from 4:1 to 1:20, and in particular from 3:1 to 1:5.

Insects that may be controlled are usually soil dwelling insects, for example termites, ants, cockroaches, beetles, earwigs, silverfish, crickets, spiders, centipedes, millipedes, scorpions, pillbugs, sow bugs, flies, mosquitoes, gnats, moths, wasps, hornets, bee, and plant nematodes, wherein termites, ants, or plant nematodes are preferred. More preferred insects are termites and ants, wherein termites are in particular preferred.

In one form the insects are termites (isoptera), preferably soil termites, especially of the *Reticulitermes* genus, for example the species *R. flavipes, R . . . virginicus, R. hageni, R. hesperus, R. okanaganensis, R. malletei, R. fibialis; R. grassei, R. banyulensis, R. balkanensis* and *R. urbis*; the *Coptotermes* genus, for example the species *C. testaceus, C. gestroi* and *C. formosanus*; the *Heterotermes* genus, for example the species *H. aureus, H. tenuis*, H. convexinotatus and H. cardini; and dry wood termites, especially of the *Incisitermes* genus, especially the species *I. snyder* and *I. minor*; and the *Cryptotermes* genus, especially the species *C. brevis* and *C. cavifrons*.

In another form the insects are ants, for example, from the *Atta* genus, such as *Atta cephalotes, Atta capigura, Atta cephalotes, Atta laevigata, Atta robusta, Atta sexdens, Atta texana*; the *Crematogaster* genus; *Lasius* genus; the *Monorium* genus, such as *Monorium pharaonis*, the *Solenopsis* genus such as *Solenopsis geminata, Solenopsis invicta, Solenopsis richteri, Solenopsis xyloni*; the *Pogonomyrmex* genus, such as *Pogonomyrmex barbatus, Pogonomyrmex califomicus*; the *Pheidole* genus, such as *Pheidole megacephala*, the *Dasymutilla* genus, such as *Dasymutilla occidentalis*; the *Camponotus* genus, such as *Camponotus floridanus*; and the *Linepithema* genus, such as *Linepithema humile*.

In one form the insects are plant nematodes, for example, *Angunina* spp., *Aphelenchoides* spp., *Belonoaimus* spp., *Bursaphelenchus* spp., *Ditylenchus dipsaci, Globodera* spp., *Heliocotylenchus* spp., *Heterodera* spp., *Longidorus* spp., *Meloidogyne* spp., *Pratylenchus* spp., *Radapholus similis, Rotylenchus* spp., *Trichodorus* spp., *Tylenchorhynchus* spp., *Tylenchulus* spp., *Tylenchulus semipenetrans* and *Xiphinema* spp..

The polymer is formed from an initiator and a plurality of $C_2$ to $C_6$ alkylene oxide units and the initiator is an aliphatic polyol with at least three hydroxyl groups.

The initiator is an aliphatic polyol with at least three hydroxyl groups, e.g. three, four, five or six. Preferably the initiator is an aliphatic polyol with three or four hydroxyl groups, wherein three hydroxyl groups are in particular preferred.

The aliphatic polyol may comprise 3 to 20, preferably 3 to 10, and in particular 3 to 6 carbon atoms. Typically the aliphatic polyol is free of hetero atoms beside the hydroxyl groups.

Suitable examples for an initiator are glycerol (also known as propane-1,2,3-trol), 1,1,1-trimethylol-propane, 1,1,1-trimethylolethane, pentaerythritol, 1,2,6-hexanetrol, •-methyl glucoside, sucrose, and sorbitol. Preferred initiator is glycerol, 1,1,1-trimethylol-propane, 1,1,1-trimethylolethane, and pentaerythritol. In particular preferred initiator is glycerol, 1,1,1-trimethylol-propane, and 1,1,1-trimethylolethane.

The polymer is formed from an initiator and a plurality of $C_2$ to $C_6$ alkylene oxide units. The alkylene oxide units preferably comprise ethylene oxide and/or propylene oxide. In particular, the alkylene oxide units comprise ethylene oxide and propylene oxide.

The polymer may have a molecular weight of 400 to 15,000 g/mol, preferably from 600 to 10,000 g/mol, and in particular from 1,000 to 7,000 g/mol.

The polymer may have a hydroxyl value (also known as OH number) from 20 to 300 mg KOH/g, preferably from 25 to 150 mg KOH/g, and in particular from 40 to 70 mg KOH/g.

The polymer may have a dynamic viscosity from 100 to 1,000 cP at 25° C., preferably 250 to 750 cP, and in particular 400 to 650 cP.

In a preferred form the polymer is formed from an initiator and a plurality of ethylene oxide and/or propylene oxide units and the initiator is an aliphatic polyol with at three or four hydroxyl groups. In another preferred form the polymer is formed from an initiator and a plurality of ethylene oxide and/or propylene oxide units and the initiator is an aliphatic polyol with at least three hydroxyl groups, and where the polymer has a molecular weight of 400 to 15,000 g/mol, preferably from 600 to 10,000 g/mol.

In a preferred form the polymer is formed from an initiator and a plurality of ethylene oxide and/or propylene oxide units and the initiator is an aliphatic polyol with at three or four hydroxyl groups, and the weight ratio of the insecticide to the polymer is in the range from 5:1 to 1:50. In another preferred form the polymer is formed from an initiator and a plurality of ethylene oxide and/or propylene oxide units and the initiator is an aliphatic polyol with at least three hydroxyl groups, and where the polymer has a molecular weight of 400 to 15,000 g/mol, preferably from 600 to 10,000 g/mol, and the weight ratio of the insecticide to the polymer is in the range from 4:1 to 1:40.

In a preferred form the polymer is formed from an initiator and a plurality of ethylene oxide and/or propylene oxide units and the initiator is an aliphatic polyol with at three or four hydroxyl groups, and the weight ratio of the insecticide to the polymer is in the range from 5:1 to 1:50, and the composition is applied to soil by soil injection. In another preferred form the polymer is formed from an initiator and a plurality of ethylene oxide and/or propylene oxide units and the initiator is an aliphatic polyol with at least three hydroxyl groups, and where the polymer has a molecular weight of 400 to 15,000 g/mol, preferably from 600 to 10,000 g/mol, and the weight ratio of the insecticide to the polymer is in the range from 4:1 to 1:40, and the composition is applied to soil by soil injection.

In another preferred form the polymer is formed from an initiator and a plurality of ethylene oxide and/or propylene oxide units and the initiator is selected from glycerol, 1,1,1-trimethylol-propane, 1,1,1-trimethylolethane, pentaerythritol, 1,2,6-hexanetriol, α-methyl glucoside, sucrose, and sorbitol. In another preferred form the polymer is formed from an initiator and a plurality of ethylene oxide and propylene oxide units and the initiator is selected from glycerol, 1,1,1-trimethylol-propane, 1,1,1-trimethylolethane, pentaerythritol, 1,2,6-hexanetrol, α-methyl glucoside, sucrose, and sorbitol.

In another preferred form the polymer is formed from an initiator and a plurality of ethylene oxide and/or propylene oxide units and the initiator is selected from glycerol, 1,1,1-trimethylol-propane, 1,1,1-trimethylolethane, pentaerythritol, 1,2,6-hexanetrol, α-methyl glucoside, sucrose, and sorbitol, and the weight ratio of the insecticide to the polymer is in the range from 4:1 to 1:40. In another preferred form the polymer is formed from an initiator and a plurality of ethylene oxide and propylene oxide units and the initiator is selected from glycerol, 1,1,1-trimethylol-propane, 1,1,1-trimethylolethane, pentaerythritol, 1,2,6-hexanetrol, α-methyl glucoside, sucrose, and sorbitol, and the weight ratio of the insecticide to the polymer is in the range from 4:1 to 1:40.

In another preferred form the polymer is formed from an initiator and a plurality of ethylene oxide and/or propylene oxide units and the initiator is selected from glycerol, 1,1,1-trimethylol-propane, 1,1,1-trimethylolethane, pentaerythritol, 1,2,6-hexanetrol, α-methyl glucoside, sucrose, and sorbitol, and the weight ratio of the insecticide to the polymer is in the range from 4:1 to 1:40, and the composition is applied to soil by soil injection. In another preferred form the polymer is formed from an initiator and a plurality of ethylene oxide and propylene oxide units and the initiator is selected from glycerol, 1,1,1-trimethylol-propane, 1,1,1-trimethylolethane, pentaerythritol, 1,2,6-hexanetrol, α-methyl glucoside, sucrose, and sorbitol, and the weight ratio of the insecticide to the polymer is in the range from 4:1 to 1:40, and the composition is applied to soil by soil injection.

In another preferred form the polymer is formed from an initiator and a plurality of ethylene oxide and/or propylene oxide units and the initiator is selected from glycerol, 1,1,1-trimethylol-propane, 1,1,1-trimethylolethane, pentaerythritol, 1,2,6-hexanetriol, α-methyl glucoside, sucrose, and sorbitol, and where the polymer has a molecular weight of 400 to 15,000 g/mol, preferably from 600 to 10,000 g/mol. In another preferred form the polymer is formed from an initiator and a plurality of ethylene oxide and propylene oxide units and the initiator is selected from glycerol, 1,1,1-trimethylol-propane, 1,1,1-trimethylolethane, pentaerythritol, 1,2,6-hexanetriol, α-methyl glucoside, sucrose, and sorbitol, and where the polymer has a molecular weight of 400 to 15,000 g/mol, preferably from 600 to 10,000 g/mol.

In another preferred form the polymer is formed from an initiator and a plurality of ethylene oxide and/or propylene oxide units and the initiator is selected from glycerol, 1,1,1-trimethylol-propane, 1,1,1-trimethylolethane, pentaerythritol, 1,2,6-hexanetriol, α-methyl glucoside, sucrose, and sorbitol, and where the polymer has a molecular weight of 400 to 15,000 g/mol, preferably from 600 to 10,000 g/mol, and the weight ratio of the insecticide to the polymer is in the range from 4:1 to 1:40. In another preferred form the polymer is formed from an initiator and a plurality of ethylene oxide and propylene oxide units and the initiator is selected from glycerol, 1,1,1-trimethylol-propane, 1,1,1-trimethylolethane, pentaerythritol, 1,2,6-hexanetrol, α-methyl glucoside, sucrose, and sorbitol, and where the polymer has a molecular weight of 400 to 15,000 g/mol, preferably from 600 to 10,000 g/mol, and the weight ratio of the insecticide to the polymer is in the range from 4:1 to 1:40.

In another preferred form the polymer is formed from an initiator and a plurality of ethylene oxide and/or propylene oxide units and the initiator is selected from glycerol, 1,1,1-trimethylol-propane, 1,1,1-trimethylolethane, pentaerythritol, 1,2,6-hexanetrol, α-methyl glucoside, sucrose, and sorbitol, and where the polymer has a molecular weight of 400 to 15,000 g/mol, preferably from 600 to 10,000 g/mol, and the weight ratio of the insecticide to the polymer is in the range from 4:1 to 1:40, and the composition is applied to soil by soil injection. In another preferred form the polymer is formed from an initiator and a plurality of ethylene oxide and propylene oxide units and the initiator is selected from glycerol, 1,1,1-trimethylol-propane, 1,1,1-trimethylolethane, pentaerythritol, 1,2,6-hexanetrol, α-methyl glucoside, sucrose, and sorbitol, and where the polymer has a molecular weight of 400 to 15,000 g/mol, preferably from 600 to 10,000 g/mol, and the weight ratio of the insecticide to the polymer is in the range from 4:1 to 1:40, and the composition is applied to soil by soil injection.

The invention further relates to a composition comprising an insecticide and a polymer where the polymer is formed from an initiator and a plurality of $C_2$ to $C_6$ alkylene oxide units, and where the initiator is an aliphatic polyol with at least three hydroxyl groups.

The composition is usually an agrochemical composition. Examples for agrochemical compositions are suspensions (e.g. SC, OD, FS), emulsifiable concentrates (e.g. EC), emulsions (e.g. EW, EO, ES, ME), capsules (e.g. CS, ZC), pastes, pastilles, wettable powders or dusts (e.g. WP, SP, WS, DP, DS), pressings (e.g. BR, TB, DT), granules (e.g. WG, SG, GR, FG, GG, MG), as well as gel formulations for the treatment of plant propagation materials such as seeds (e.g. GF). These and further compositions types are defined in the "Catalogue of pesticide formulation types and international coding system", Technical Monograph No. 2, 6$^{th}$Ed. May 2008, CropLife International. The compositions may be prepared in a known manner, such as described by Mollet and Grubemann, Formulation technology, Wiley VCH, Weinheim, 2001; or Knowles, New developments in crop protection product formulation, Agrow Reports DS243, T&F Informa, London, 2005.

The composition is preferably a liquid composition. The composition is preferably a suspension (e.g. SC, OD, FS), an emulsifiable concentrate (e.g. EC), or an emulsion (e.g. EW, EO, ES, ME), wherein the suspension is in particular preferred.

The composition usually comprises an auxiliary. Examples for suitable auxiliaries are solvents, liquid carriers, solid carriers or fillers, surfactants, dispersants, emulsifiers, wetters, adjuvants, solubilizers, penetration enhancers, protective colloids, adhesion agents, thickeners, humectants, repellents, attractants, feeding stimulants, compatibilizers, bactericides, anti-freezing agents, anti-foaming agents, colorants, tackifiers and binders.

Suitable solvents and liquid carriers are water and organic solvents, such as mineral oil fractions of medium to high boiling point, e.g. kerosene, diesel oil; oils of vegetable or animal origin; aliphatic, cyclic and aromatic hydrocarbons, e. g. toluene, paraffin, tetrahydronaphthalene, alkylated naphthalenes; alcohols, e.g. ethanol, propanol, butanol, benzylalcohol, cyclohexanol; glycols; DMSO; ketones, e.g. cyclohexanone; esters, e.g. lactates, carbonates, fatty acid esters, gamma-butyrolactone; fatty acids; phosphonates; amines; amides, e.g. N-methylpyrrolidone, fatty acid dimethylamides; and mixtures thereof.

Suitable solid carriers or fillers are mineral earths, e.g. silicates, silica gels, talc, kaolins, limestone, lime, chalk, clays, dolomite, diatomaceous earth, bentonite, calcium sulfate, magnesium sulfate, magnesium oxide; polysaccharide powders, e.g. cellulose, starch; fertilizers, e.g. ammonium sulfate, ammonium phosphate, ammonium nitrate, ureas; products of vegetable origin, e.g. cereal meal, tree bark meal, wood meal, nutshell meal, and mixtures thereof.

Suitable surfactants are surface-active compounds, such as anionic, cationic, nonionic and amphoteric surfactants, block polymers, polyelectrolytes, and mixtures thereof. Such surfactants can be used as emusifier, dispersant, solubilizer, wetter, penetration enhancer, protective colloid, or adjuvant. Examples of surfactants are listed in McCutcheon's, Vol.1: Emulsifiers & Detergents, McCutcheon's Directories, Glen Rock, USA, 2008 (International Ed. or North American Ed.).

Suitable anionic surfactants are alkali, alkaline earth or ammonium salts of sulfonates, sulfates, phosphates, carboxylates, and mixtures thereof. Examples of sulfonates are alkylarylsulfonates, diphenylsulfonates, alpha-olefin sulfonates, lignine sulfonates, sulfonates of fatty acids and oils, sulfonates of ethoxylated alkylphenols, sulfonates of alkoxylated arylphenols, sulfonates of condensed naphthalenes, sulfonates of dodecyl- and tridecylbenzenes, sulfonates of naphthalenes and alkylnaphthalenes, sulfosuccinates or sulfosuccinamates. Examples of sulfates are sulfates of fatty acids and oils, of ethoxylated alkylphenols, of alcohols, of ethoxylated alcohols, or of fatty acid esters. Examples of phosphates are phosphate esters. Examples of carboxylates are alkyl carboxylates, and carboxylated alcohol or alkylphenol ethoxylates.

Suitable nonionic surfactants are alkoxylates, N-subsituted fatty acid amides, amine oxides, esters, sugar-based surfactants, polymeric surfactants, and mixtures thereof. Examples of alkoxylates are compounds such as alcohols, alkylphenols, amines, amides, arylphenols, fatty acids or fatty acid esters which have been alkoxylated with 1 to 50 equivalents. Ethylene oxide and/or propylene oxide may be employed for the alkoxylation, preferably ethylene oxide. Examples of N-subsititued fatty acid amides are fatty acid glucamides or fatty acid alkanolamides. Examples of esters are fatty acid esters, glycerol esters or monoglycerides. Examples of sugar-based surfactants are sorbitans, ethoxylated sorbitans, sucrose and glucose esters or alkylpolyglucosides. Examples of polymeric surfactants are home- or copolymers of vinylpyrrolidone, vinylalcohols, or vinylacetate.

Suitable cationic surfactants are quaternary surfactants, for example quaternary ammonium compounds with one or two hydrophobic groups, or salts of long-chain primary amines. Suitable amphoteric surfactants are alkylbetains and imidazolines. Suitable block polymers are block polymers of the A-B or A-B-A type comprising blocks of polyethylene oxide and polypropylene oxide, or of the A-B-C type comprising alkanol, polyethylene oxide and polypropylene oxide. Suitable polyelectrolytes are polyacids or polybases. Examples of polyacids are alkali salts of polyacrylic acid or polyacid comb polymers. Examples of polybases are polyvinylamines or polyethyleneamines.

Suitable adjuvants are compounds, which have a negligible or even no pesticidal activity themselves, and which improve the biological performance of the compound I on the target. Examples are surfactants, mineral or vegetable oils, and other auxilaries. Further examples are listed by Knowles, Adjuvants and additives, Agrow Reports DS256, T&F Informa UK, 2006, chapter 5.

Suitable thickeners are polysaccharides (e.g. xanthan gum, carboxymethylcellulose), anorganic clays (organically modified or unmodified), polycarboxylates, and silicates. Suitable bactericides are bronopol and isothiazolinone derivatives such as alkylisothiazolinones and benzisothiazolinones. Suitable anti-freezing agents are ethylene glycol, propylene glycol, urea and glycerin.

Suitable anti-foaming agents are silicones, long chain alcohols, and salts of fatty acids. Suitable colorants (e.g. in red, blue, or green) are pigments of low water solubility and water-soluble dyes. Examples are inorganic colorants (e.g. iron oxide, titan oxide, iron hexacyanoferrate) and organic colorants (e.g. alizarin-, azo- and phthalocyanine colorants). Suitable tackifiers or binders are polyvinylpyrrolidons, polyvinylacetates, polyvinyl alcohols, polyacrylates, biological or synthetic waxes, and cellulose ethers.

Examples for agrochemical composition types and their preparation are:
 i) Water-soluble concentrates (SL, LS)
    10-60 wt % of a compound I according to the invention and 5-15 wt % wetting agent (e.g. alcohol alkoxylates) are dissolved in water and/or in a water-soluble solvent (e.g. alcohols) up to 100 wt %. The active substance dissolves upon dilution with water.
 ii) Dispersible concentrates (DC)
    5-25 wt % of a compound I according to the invention and 1-10 wt % dispersant (e. g. polyvinylpyrrolidone) are dissolved in up to 100 wt % organic solvent (e.g. cyclohexanone). Dilution with water gives a dispersion.

iii) Emulsifiable concentrates (EC)

15-70 wt % of a compound I according to the invention and 5-10 wt % emulsifiers (e.g. calcium dodecylbenzenesulfonate and castor oil ethoxylate) are dissolved in up to 100 wt % water-insoluble organic solvent (e.g. aromatic hydrocarbon). Dilution with water gives an emulsion.

iv) Emulsions (EW, EO, ES)

5-40 wt % of a compound I according to the invention and 1-10 wt % emulsifiers (e.g. calcium dodecylbenzenesulfonate and castor oil ethoxylate) are dissolved in 20-40 wt % water-insoluble organic solvent (e.g. aromatic hydrocarbon). This mixture is introduced into up to 100 wt % water by means of an emulsifying machine and made into a homogeneous emulsion. Dilution with water gives an emulsion.

v) Suspensions (SC, OD, FS)

In an agitated ball mill, 20-60 wt % of a compound I according to the invention are comminuted with addition of 2-10 wt % dispersants and wetting agents (e.g. sodium lignosulfonate and alcohol ethoxylate), 0,1-2 wt % thickener (e.g. xanthan gum) and up to 100 wt % water to give a fine active substance suspension. Dilution with water gives a stable suspension of the active substance. For FS type composition up to 40 wt % binder (e.g. polyvinylalcohol) is added.

vi) Water-dispersible granules and water-soluble granules (WG, SG)

50-80 wt % of a compound I according to the invention are ground finely with addition of up to 100 wt % dispersants and wetting agents (e.g. sodium lignosulfonate and alcohol ethoxylate) and prepared as water-dispersible or water-soluble granules by means of technical appliances (e. g. extrusion, spray tower, fluidized bed). Dilution with water gives a stable dispersion or solution of the active substance.

vii) Water-dispersible powders and water-soluble powders (WP, SP, WS)

50-80 wt % of a compound I according to the invention are ground in a rotor-stator mill with addition of 1-5 wt % dispersants (e.g. sodium lignosulfonate), 1-3 wt % wetting agents (e.g. alcohol ethoxylate) and up to 100 wt % solid carrier, e.g. silica gel. Dilution with water gives a stable dispersion or solution of the active substance.

viii) Gel (GW, GF)

In an agitated ball mill, 5-25 wt % of a compound I according to the invention are comminuted with addition of 3-10 wt % dispersants (e.g. sodium lignosulfonate), 1-5 wt % thickener (e.g. carboxymethylcellulose) and up to 100 wt % water to give a fine suspension of the active substance. Dilution with water gives a stable suspension of the active substance.

iv) Microemulsion (ME)

5-20 wt % of a compound I according to the invention are added to 5-30 wt % organic solvent blend (e.g. fatty acid dimethylamide and cyclohexanone), 10-25 wt % surfactant blend (e.g. alkohol ethoxylate and arylphenol ethoxylate), and water up to 100%. This mixture is stirred for 1 h to produce spontaneously a thermodynamically stable microemulsion.

iv) Microcapsules (CS)

An oil phase comprising 5-50 wt % of a compound I according to the invention, 0-40 wt % water insoluble organic solvent (e.g. aromatic hydrocarbon), 2-15 wt % acrylic monomers (e.g. methylmethacrylate, methacrylic acid and a di- or triacrylate) are dispersed into an aqueous solution of a protective colloid (e.g. polyvinyl alcohol). Radical polymerization initiated by a radical initiator results in the formation of poly(meth)acrylate microcapsules. Alternatively, an oil phase comprising 5-50 wt % of a compound I according to the invention, 0-40 wt % water insoluble organic solvent (e.g. aromatic hydrocarbon), and an isocyanate monomer (e.g. diphenylmethene-4,4'-diisocyanatae) are dispersed into an aqueous solution of a protective colloid (e.g. polyvinyl alcohol). The addition of a polyamine (e.g. hexamethylenediamine) results in the formation of a polyurea microcapsules. The monomers amount to 1-10 wt %. The wt % relate to the total CS composition.

ix) Dustable powders (DP, DS)

1-10 wt % of a compound I according to the invention are ground finely and mixed intimately with up to 100 wt % solid carrier, e.g. finely divided kaolin.

x) Granules (GR, FG)

0.5-30 wt % of a compound I according to the invention is ground finely and associated with up to 100 wt % solid carrier (e.g. silicate). Granulation is achieved by extrusion, spray-drying or the fluidized bed.

xi) Ultra-low volume liquids (UL)

1-50 wt % of a compound I according to the invention are dissolved in up to 100 wt % organic solvent, e.g. aromatic hydrocarbon.

The compositions types i) to xi) may optionally comprise further auxiliaries, such as 0,1-1 wt % bactericides, 5-15 wt % anti-freezing agents, 0,1-1 wt % anti-foaming agents, and 0,1-1 wt % colorants.

The agrochemical compositions generally comprise between 0.01 and 95%, preferably between 0.1 and 90%, and most preferably between 0.5 and 75%, by weight of active substance. The active substances are employed in a purity of from 90% to 100%, preferably from 95% to 100% (according to NMR spectrum).

Water-soluble concentrates (LS), Suspoemulsions (SE), flowable concentrates (FS), powders for dry treatment (DS), water-dispersible powders for slurry treatment (WS), water-soluble powders (SS), emulsions (ES), emulsifiable concentrates (EC) and gels (GF) are usually employed for the purposes of treatment of plant propagation materials, particularly seeds. The compositions in question give, after two-to-tenfold dilution, active substance concentrations of from 0.01 to 60% by weight, preferably from 0.1 to 40% by weight, in the ready-to-use preparations. Application can be carried out before or during sowing. Methods for applying or treating compound I and compositions thereof, respectively, on to plant propagation material, especially seeds include dressing, coating, pelleting, dusting, soaking and in-furrow application methods of the propagation material. Preferably, compound I or the compositions thereof, respectively, are applied on to the plant propagation material by a method such that germination is not induced, e. g. by seed dressing, pelleting, coating and dusting.

When employed in plant protection, the amounts of active substances applied are, depending on the kind of effect desired, from 0.001 to 2 kg per ha, preferably from 0.005 to 2 kg per ha, more preferably from 0.05 to 0.9 kg per ha, in particular from 0.1 to 0.75 kg per ha.

In treatment of plant propagation materials such as seeds, e. g. by dusting, coating or drenching seed, amounts of active substance of from 0.1 to 1000 g, preferably from 1 to 1000 g, more preferably from 1 to 100 g and most preferably from 5 to 100 g, per 100 kilogram of plant propagation material (preferably seed) are generally required. When used in the protection of materials or stored products, the amount of active substance applied depends on the kind of application area and on the desired effect. Amounts customarily applied in the protection of materials are 0.001 g to 2 kg, preferably 0.005 g to 1 kg, of active substance per cubic meter of treated material.

Various types of oils, wetters, adjuvants, fertilizer, or micronutrients, and other pesticides (e.g. herbicides, insecticides, fungicides, growth regulators, safeners) may be added to the active substances or the compositions comprising them as premix or, if appropriate not until immediately prior to use (tank mix). These agents can be admixed with the compositions according to the invention in a weight ratio of 1:100 to 100:1, preferably 1:10 to 10:1.

The present invention offers various advantages: The insecticide may move deep into the soil. The polymer is usually easily formulated in standard agrochemical compositions. The composition is usually physically stable for long product shelf life. The composition may have an acceptable toxic profile (e.g. acceptable low eye irritation).

EXAMPLES

Polymer A: Polymer formed from glycerol and ethylene oxide and propylene oxide units; molecular weight about 3000 g/mol, hydroxyl number about 56 mg KOH/g, clear liquid, dynamic viscosity at 25° C. about 582 cP, density at 25° C. about 1.02 g/cm$^3$.

Polymer B: Liquid composition, 70 wt % Polymer A, 10 wt % nonionic surfactant (ethoxylated alcohol, HLB about 13, hydroxyl number about 125), 10 wt % anionic surfactant (dodecylbenzene calcium sulfonate), and 10 wt % 1,2-propylene glycol.

Surfactant A: liquid, nonionic ethoxylated tristyrylphenol, HLB 10-11.

Surfactant B: nonionic EO-PO-EO Triblockcopolymer, average molecular weight about 2500 Da, pour point −4° C., HLB 1-7, solubility in water at least 10 wt % at 25° C.

Surfactant C: Alkyl polyethylene glycol ether based on C10-Guerbet alcohol, HLB about 13, solubility in water at least 10 wt % at 23° C.

Surfactant D: Calcium dodecylbenzene sulfonate.

Silica Thickener: White powder, hydrophilic fumed silica, specific surface area (BET) about 200 m$^2$/g; average primary particle diameter 12 nm, tapped density about 0.05 kg/m$^3$.

Wetting Front Test Procedure

A fine nylon netting was adhered (Polyseamseal® Caulk, Henkel Corp) to one end each of 15 cm×1.5 cm plastic tubes. Tubes were filled with Greenville silt loam (sand:silt:clay, 22:58:20). As soil was added, tubes were tapped on the lab bench to loosely pack the soil (approximately 50 g soil per tube). Aqueous solutions of subject treatments were prepared. Solutions (4 ml) were added to glass beakers (50 ml capacity), and the soil-filled tubes were placed in the beakers. Each treatment was replicated 4 times. The solutions migrated upward into the soil via capillary action, and after 20 hours, the wetting front was measured in three locations using a digital caliper. Means were separated at the 0.05% level via ANOVA followed by Tukey's HSD.

Example 1: Soil Migration of Chlorfenapyr

An aquous solution comprising 600 ppm chlorphenapyr was made from Phantoms® Termiticide (aqueous SC with 21.45 wt % chlorfenapyr content, BASE Corp.). Optionally 1200 ppm or 3000 ppm of Polymer B was added. The results of the wetting front test are summarized in Table 1.

TABLE 1

| Chlorfenapyr | Polymer | Migration [cm] | Average Migration [cm] |
|---|---|---|---|
| 600 ppm | — | 7.7780 | 7.68 |
|  |  | 7.5100 |  |
|  |  | 7.6600 |  |
|  |  | 7.7640 |  |
| 600 ppm | 1200 ppm | 8.4290 | 8.39 |
|  |  | 8.4350 |  |
|  |  | 8.3770 |  |
|  |  | 8.3350 |  |
| 600 ppm | 3000 ppm | 8.7420 | 8.81 |
|  |  | 8.7610 |  |
|  |  | 8.8760 |  |
|  |  | 8.8460 |  |

Example 2: Soil Migration of Broflanilide

An aqueous solution comprising 600 ppm broflanilide was made from an aqueous suspension concentrate of broflanilide. Optionally 1500 ppm, 3000 ppm or 4200 ppm of Polymer A was added. The results of the wetting front test are summarized in Table 2.

TABLE 2

| Broflanilide | Polymer | Migration [cm] | Average Migration [cm] |
|---|---|---|---|
| 600 ppm | 1500 ppm | 8.89 | 9.29 |
|  |  | 9.34 |  |
|  |  | 9.34 |  |
|  |  | 9.6 |  |
| 600 ppm | 3000 ppm | 8.60 | 8.74 |
|  |  | 9.19 |  |
|  |  | 8.53 |  |
|  |  | 8.62 |  |
| 600 ppm | 4200 ppm | 8.37 | 8.79 |
|  |  | 9.22 |  |
|  |  | 8.74 |  |
|  |  | 8.82 |  |

Example 3: Soil Migration of Broflanilide

An aqueous solution comprising 600 ppm broflanilide was made from an aqueous suspension concentrate comprising 100 g/l broflanilide. Optionally 3000 ppm of Polymer B was added. The wetting front test was made as described above with another analytical method:

The soil filled tubes (four replicates for both the sample with and without polymer) were separated in seven segments with each 2 cm long. The segment "0-2 cm" was the segment on the bottom which had direct contact to the aqueous solution of broflanilide. The segments (about 4.0 g each) were extracted twice with acetonitrile. The amount of broflanilide was quantified via HPLC with UV detection. The amounts are summarized in Table 3.

TABLE 3

| | Concentration of broflanilide [ppm] in segments (average of four replicates) | | | | |
|---|---|---|---|---|---|
| Polymer | 0-2 cm | 2-4 cm | 4-6 cm | 6-8 cm | 8-10 cm |
| — | 127 | 51 | 3 | 0 | 0 |
| 3000 ppm | 170 | 36 | 16 | 4 | 0 |

Example 4: Soil Migration of Broflanilide

An aqueous solution comprising 600 ppm broflanilide was made from an aqueous suspension concentrate comprising 100 g/l broflanilide. Optionally 300, 600 or 1500 ppm of Polymer A was added. The results of the wetting front test are summarized in Table 4.

TABLE 4

| Broflanilide | Polymer | Migration [cm] | Average Migration [cm] |
| --- | --- | --- | --- |
| 600 ppm | — | 7.32 | 6.89 |
| | | 6.75 | |
| | | 6.61 | |
| | | 6.88 | |
| 600 ppm | 300 ppm | 7.71 | 7.78 |
| | | 7.80 | |
| | | 7.90 | |
| | | 7.72 | |
| 600 ppm | 600 ppm | 7.98 | 7.98 |
| | | 7.77 | |
| | | 8.04 | |
| | | 8.02 | |
| 600 ppm | 1500 ppm | 7.73 | 7.72 |
| | | 7.69 | |
| | | 7.82 | |
| | | 7.64 | |

Example 5: Soil Migration of Fipronil

An aqueous solution comprising 600 ppm fipronil was made from an aqueous suspension concentrate comprising 9.1 wt % fipronil (Termidor® SC, BASF). Optionally 1200 ppm or 3000 ppm of Polymer B was added. The results of the wetting front test are summarized in Table 5a (2 h soil treatment) and 5b (20 h soil treatment).

TABLE 5a

| | | after 2 h | |
| --- | --- | --- | --- |
| Fipronil | Polymer | Migration [cm] | Average Migration [cm] |
| 600 ppm | — | 6.0 | 6.25 |
| | | 6.1 | |
| | | 6.5 | |
| | | 6.4 | |
| 600 ppm | 1200 ppm | 6.6 | 6.70 |
| | | 6.5 | |
| | | 7.0 | |
| | | 6.7 | |
| 600 ppm | 3000 ppm | 7.1 | 6.98 |
| | | 7.0 | |
| | | 7.0 | |
| | | 6.8 | |

TABLE 5b

| | | after 20 h | |
| --- | --- | --- | --- |
| Fipronil | Polymer | Migration [cm] | Average Migration [cm] |
| 600 ppm | — | 7.0 | 7.38 |
| | | 7.4 | |
| | | 7.4 | |
| | | 7.7 | |
| 600 ppm | 1200 ppm | 8.0 | 7.93 |
| | | 7.7 | |
| | | 8.0 | |
| | | 8.0 | |
| 600 ppm | 3000 ppm | 8.5 | 8.40 |
| | | 8.3 | |
| | | 8.4 | |
| | | 8.4 | |

Example 6: Broflanilide Suspension in Propylene Glycol

The broflanilide suspension having the following composition was prepared by adding the components according to Table 6 into 1,2-propylene glycol while agitating. The agitation was continued until homogenous. The mixture was then wet milled using a bead mill to particle size of the insecticide around 2 μm.

TABLE 6

| | Amount (wt/wt %) |
| --- | --- |
| Broflanilide | 4.4 |
| Polymer A | 21.8 |
| Surfactant A | 14.1 |
| Surfactant B | 14.1 |
| Surfactant C | 5 |
| Surfactant D | 5 |
| Silica Thickener | 1 |
| 1,2-propylene glycol | Up to 100% |

Three prepared samples were stored under the following conditions: (a) one sample was stored at −10° C., (b) another sample was stored at F/T (daily cycling temperature from −10° C. to 30° C.) and (c) a third sample was stored at 54° C. for two weeks. The particle size was measured before/after storage by Malvern Mastersizer 2000.

The suspension stability was determined by visual observation of sample phase separation after storage as well as particle size increase before/after storage at different storage temperatures. It was found there was no increase in particle size at all storage temperatures and no phase separation occurred, therefore, the suspension with Polymer A was physically stable.

The invention claimed is:

1. A method for controlling insects wherein a composition comprising an insecticide and a polymer are applied to soil, wherein the polymer is an alkoxylated aliphatic polyol, wherein the polymer is formed from reactive components consisting of an initiator and a plurality of $C_2$ to $C_6$ alkylene oxide units, and wherein the initiator is an aliphatic polyol with at least three hydroxyl groups,
wherein the alkylene oxide units comprise ethylene oxide and/or propylene oxide,
wherein said polymer has an OH number from 20 to 300 mg KOH/g, and
wherein the insecticide has a solubility in water at 20° C. of up to 10 g/l.

2. The method according to claim 1 wherein the insects are soil dwelling insects.

3. The method according to claim 1 wherein the insects are termites or ants.

4. The method according to claim 1 wherein a weight ratio of the insecticide to the polymer is in the range from 5:1 to 1:50.

5. The method according to claim 1 wherein the soil is present under a building or within a radius of 50 m thereof.

6. The method according to claim 1 wherein the composition is applied to soil by soil injection.

7. The method according to claim 1 wherein the composition is applied in form of an aqueous dilution which comprises from 100 to 10,000 ppm of the polymer.

8. The method according to claim 1 wherein the initiator is an aliphatic polyol with three or four hydroxyl groups.

9. The method according to claim 1 wherein the polymer has a molecular weight of 400 to 15,000 g/mol.

10. A composition comprising an insecticide and a polymer,
    wherein the insecticide is selected from the group consisting of fipronil, allethrin, alphacypermethrin, beta-cyfluthrin, bifenthrin, bioallethrin, 4-chloro-2-(2-chloro-2-methylpropyl)-5-[(6-iodo-3-pyridiny) methoxy]-3(2H)-pyridazinone (CAS-RN: 120955-77-3), chlorantraniliprole, chlorfenapyr, chlorpyrifos, cyantraniliprole, cyfluthrin, cyhalothrin, cypermethrin, deltamethrin, etofenprox, fenoxycarb, flufenoxuron, hydramethylnon, imidacloprid, indoxacarb, metaflumizone, permethrin, pyriproxifen, tebufenozide, tralomethrin, broflanilide, and combinations thereof,
    wherein the polymer is an alkoxylated aliphatic polyol,
    wherein the polymer is formed from reactive components consisting of an initiator and a plurality of $C_2$ to $C_6$ alkylene oxide units,
    wherein the initiator is an aliphatic polyol with at least three hydroxyl groups,
    wherein the alkylene oxide units comprise ethylene oxide and/or propylene oxide,
    wherein said polymer has an OH number from 20 to 300 mg KOH/g,
    wherein the insecticide has a solubility in water at 20° C. of up to 10 g/l,
    wherein the composition is an agrochemical composition configured to be applied to soil, and
    wherein the composition is in a form selected from the group consisting of suspensions, capsules, pastes, pastilles, wettable powders or dusts, pressings, granules, and gel formulations.

11. The composition according to claim 10 wherein a weight ratio of the insecticide to the polymer is in the range from 5:1 to 1:50.

12. The composition according to claim 10 wherein the insecticide is a termiticide.

13. The composition according to claim 10 wherein the initiator is an aliphatic polyol with three or four hydroxyl groups.

14. The composition according to claim 10 wherein the polymer has a molecular weight of 400 to 15,000 g/mol.

15. The composition according to claim 10, wherein the insecticide is selected from the group consisting of fipronil, chlorfenapyr, and broflanilide.

16. The composition according to claim 10, wherein the insecticide is selected from the group consisting of allethrin, alphacypermethrin, beta-cyfluthrin, bifenthrin, bioallethrin, 4-chloro-2-(2-chloro-2-methylpropyl)-5-[(6-iodo-3-pyridiny)methoxy]-3(2H)-pyridazinone (CAS-RN: 120955-77-3), chlorantraniliprole, chlorfenapyr, chlorpyrifos, cyantraniliprole, cyfluthrin, cyhalothrin, cypermethrin, deltamethrin, etofenprox, fenoxycarb, flufenoxuron, hydramethylnon, imidacloprid, indoxacarb, metaflumizone, permethrin, pyriproxifen, tebufenozide, tralomethrin, broflanilide, and combinations thereof.

* * * * *